United States Patent
Mancisidor

(10) Patent No.: US 6,519,623 B1
(45) Date of Patent: Feb. 11, 2003

(54) GENERIC SEMAPHORE FOR CONCURRENT ACCESS BY MULTIPLE OPERATING SYSTEMS

(75) Inventor: Rodolfo Augusto Mancisidor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 08/742,104

(22) Filed: Oct. 31, 1996

(51) Int. Cl.$^7$ .................................................. G06F 9/00
(52) U.S. Cl. ........................ 709/100; 709/102; 709/328
(58) Field of Search .......................... 395/674; 709/100, 709/101, 102, 103, 104, 105, 106, 322, 332, 328; 713/200, 164, 167; 710/200; 714/2

(56) References Cited

U.S. PATENT DOCUMENTS

| | | | | |
|---|---|---|---|---|
| 5,138,713 A | * | 8/1992 | Loten | ........................ 395/674 |
| 5,475,845 A | | 12/1995 | Orton et al. | |
| 5,504,814 A | * | 4/1996 | Miyahara | ........................ 380/4 |
| 5,519,867 A | | 5/1996 | Moeller et al. | |

OTHER PUBLICATIONS

Multithreaded Programming Guide, Sunsoft, pp. 66–77, 1994.*
OpensVMS RTL Parallel Processing (PPL$) Manwaz Dec., pp. 1–2, 4–1–4–17, May, 1993.*
Richard Lam, Cross–Platform Communication Classes, Dr. Dobb's Journal on CD–ROM, p. 1–13, Mar. 1995.*
Richard Lam, Shared Memory and Message Queues, Dr. Dobb's Journal on CD–ROM, p. 1–11, May, 1995.*
*The Logical Design of Operating Systems*, 1988, Prentic Hall, Englewood Cliffs, New Jersey, L. Bic et al, pp. 52–53.
IBM TDB, "Microkernel Synchronization Primitives", vol. 38, No. 5, May 1995, pp. 283–291.
IBM TDB, "Microkernel Semaphores", vol. 38, No. 7, Jul. 1995, pp. 111–117.

* cited by examiner

Primary Examiner—Majid A. Banankhah
(74) Attorney, Agent, or Firm—Jeffrey S. LaBaw; Bracewell & Patterson, L.L.P.

(57) ABSTRACT

A generic semaphore supporting semaphore operations from multiple operating systems concurrently. Operating system semaphore invocations are transformed into a generic semaphore API that enables implementation of the semaphores. The generic API enables modification to the semaphore value depending upon the current semaphore value, and enables the queuing of threads to enable waiting upon semaphore operations. The semaphore operations implement synchronization of resource access and synchronization of process or thread execution. The generic semaphore enables applications for specific operating system personalities to execute on a microkernel system without modification of the application semaphore logic. This enables application programmers to code applications using known semaphore operations without regard to their final execution location.

11 Claims, 3 Drawing Sheets

A semaphore has a value V and a set of waiting threads W.
The cardinality of W is denoted |W|. C represents a positive integer.
All possible semaphore states are shown as well as all operations that
cause state transitions

GENERIC SEMAPHORE FOR CONCURRENT ACCESS BY MULTIPLE OPERATING SYSTEMS

BACKGROUND OF THE INVENTION

1. Field of the Invention

The present invention relates to operating systems for controlling the operations of digital computers. More particularly, the present invention relates to microkernel operating systems that segregate kernel functions from operating systems personality and applications. Still more particularly, the present invention provides generic microkernel semaphores that allow concurrent semaphore management by emulating multiple operating system semaphore interfaces.

2. Background and Related Art

Existing computer operating systems provide synchronization primitives frequently called semaphores for controlling access to system resources and synchronizing the activities of multiple processes. Synchronization primitives of each operating system are unique to that operating system even though they implement similar functionality. A microkernel operating system, such as the IBM microkernel, provides basic system function to support multiple operating system personalities. This permits application programs written for different operating systems to concurrently operate with each invoking interfaces of its home operating system. The IBM microkernel, therefore, must provide synchronization primitives that support synchronization primitives of the other operating systems. Without such generality, resource synchronization will be limited to synchronization within one particular operating system which may fail to provide adequate support across multiple operating system personalities.

A second problem is that application developers have learned to use a programming style for synchronization from a particular operating system. Retention of operating systems specific synchronization interfaces enables those programmers to continue development without learning a new microkernel based synchronization mechanism.

Operating systems typically divide synchronization primitives into two areas: locking and waiting.

Locking is used to protect shared resources from parallel or concurrent access by more than one thread. The resources that are locked are usually data structures, but they can be anything including files, devices, etc. Typically, but not always, the resources are held for a short duration so threads that need access to the resource usually don't have to wait to acquire the protecting lock. Locking primitives range from the simple mutex (which can only be acquired in the exclusive mode) to those that distinguish between different types of access such as access for read only, or access for read and write.

Waiting primitives are used to suspend execution until some event occurs. Typically the wait is of long or unbounded duration. Waiting is frequently used to synchronize operations performed by multiple threads within a single process. For example, one thread may need to wait until the operation performed by a related thread is complete.

Modern operating systems often implement a semaphore as a condition variable. Condition variables are used to wait for events to happen. Condition variables work in conjunction with locks to wait for the events while allowing other threads to enter the critical section protected by the lock. This combination is used to implement monitors and experience has shown that fewer programming mistakes are made with condition variables than with semaphores. Condition variables must be coded inside a while loop that tests for the event or condition. As a result, the waiting thread is the one ensuring that the condition is true before proceeding. When semaphores are used, it is the signaler that must ensure that the condition will be true when the waiter is rescheduled. This can lead to subtle programming errors.

The traditional semaphore was proposed by Dijkstra and constitutes a non-negative value (*The Logical Design of Operating Systems*, L. Bic and A. C. Shaw, 1988, which references "Cooperating Sequential Processes", E. W. Dijkstra, Mathematics Depts., Technological University, Eindhoven, The Netherlands.) Dijkstra semaphores have only two operations: P and V. The P operation causes a wait until the semaphore is positive then decrements its value by one. The V operation increments the value of the semaphore by one.

Other authors have changed the number and character of operations allowed on semaphores. Operating systems have also changed the character and types of operations allowed on semaphores. Today there are a surprising variety in the types of operations that can be performed on semaphores. Programming books often have entire sections or chapters explaining the subtleties of how a semaphore works on a specific operating system.

The use of synchronization mechanisms in microkernel based operating systems are discussed in U.S. Pat. No. 5,519,867 entitled "Object-Oriented Multitasking System", to Moeller et al and U.S. Pat. No. 5,475,845 entitled "Wrapper System for Interfacing to an Object-Oriented Application to a Procedural Application", to Orton et al. These patents describe the Taligent Operating System that employs the Mach Microkernel from Carnegie Mellon University. They describe the requirement for synchronization and the need to provide synchronization primitives or semaphores in an operating system. These patents describe the use of standard semaphores for a single operating system but provide no teaching of an ability to support multiple operating system semaphore architectures by a single microkernel based semaphore system.

Low level synchronization primitives are described in the IBM Technical Disclosure Bulletin entitled "Microkernel Synchronization Primitives", Volume 38, No. 5, May 1995, pp. 283–291. These primitives support the implementation of semaphores such as those disclosed herein but provide no application level interfaces that map to existing operating system syntax.

IBM Technical Disclosure Bulletin entitled "Microkernel Semaphores", Volume 38, No. 7, July 1995 pages 111–117, describes basic semaphore support in the IBM microkernel. However, these semaphore operations provide a single operating system based implementation that do not allow the emulation of semaphore operations provided by other operating systems.

The technical problem therefore remains of providing a generic semaphore operation that supports semaphores from multiple operating system personalities and in an efficient manner that is transparent to those personalities.

SUMMARY OF THE INVENTION

The present invention is directed to providing a generic semaphore operation that is able to emulate and respond to semaphore API's from multiple operating system personalities. Semaphore operations of the present invention allow concurrent resource control and process synchronization from multiple operating system personalities. This enables a single resource to be used by applications using different operating system personalities.

It is therefore an object of the present invention to provide a single set of semaphore operations that emulate and support multiple concurrent operating systems.

It is yet another object of the present invention to provide efficient semaphore operations that do not require significant overhead to process.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

For the purposes of describing the present invention a semaphore will be defined as having a signed integer value and a set of threads waiting on the semaphore. The value can be changed in an absolute or relative manner. That is, there are operations to add a given signed integer to the semaphore as well as operations to set its value to a given integer. A semaphore, according to the present invention, must maintain the following invariant relation: the number of threads waiting on the semaphore is zero when the semaphore value is non-negative and equal to the absolute value of the semaphore value when it is negative.

The invariant relation expressed above has the following implications. Whenever a thread requests that the value of the semaphore be decremented, if the resulting value is negative a thread must be added to the waiting set. The "victim" is the thread that requested the operation and an identifier of that thread must be added to the semaphore's set of waiting threads. Operations to decrement the value of the semaphore by more than one are not allowed since that would require placing two or more threads in the waiting queue and only the identity of the caller is known. When a timeout of a waiting thread expires, the count is incremented.

Figure 1:
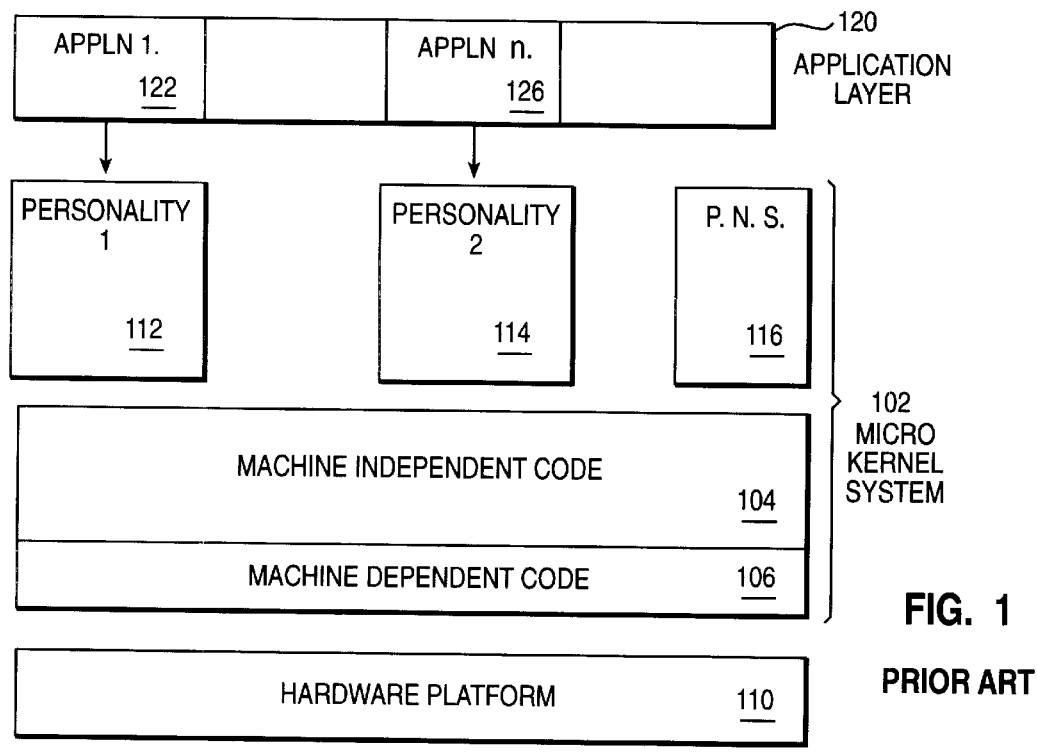
FIG. 1 is a block diagram illustrating a microkernel operating system according to the present invention.

The present invention is directed to providing semaphore operations in a microkernel system that supports multiple operating system personalities. A microkernel system is described with reference to FIG. 1. A microkernel system is shown generally at 102. Microkernel services are provided on top of the hardware platform 110. Microkernel services include machine independent code 104 and machine dependent code 106. The segregation of machine dependent code into a single layer 106 enables microkernel services to be ported to multiple hardware platforms 110 with minimal changes to the code. Microkernel services 104 support interprocess communication, and provides functions such as memory management, boot management, and operating system personality invocation. The semaphore operations of the present invention are embodied in the machine independent code of the microkernel services.

The microkernel services support multiple operating system personalities as shown at 112, and 114. The operating system personalities may include the IBM OS/2 Operating System, the IBM AIX Operating System, the Apple-Macintosh Operating System, or any other operating system variant that has been modified to operate with microkernel services. In addition, the microkernel supports operating system personality neutral services 116 such as file management, security and authentication.

The implementation of multiple operating system personalities enables application programs 120 to run with native operating system interfaces for different operating system personalities. This allows the concurrent operation of programs written for different operating systems on a single computer device. For example, application 122 may use IBM OS/2 Operating System interfaces through the OS/2 personality 112. A second program 126 may use Macintosh Operating System interfaces through a Macintosh personality 114. When these two different processes require access to a single resource such as a disk unit or communications processing device, semaphore operations may be required.

Figure 2:
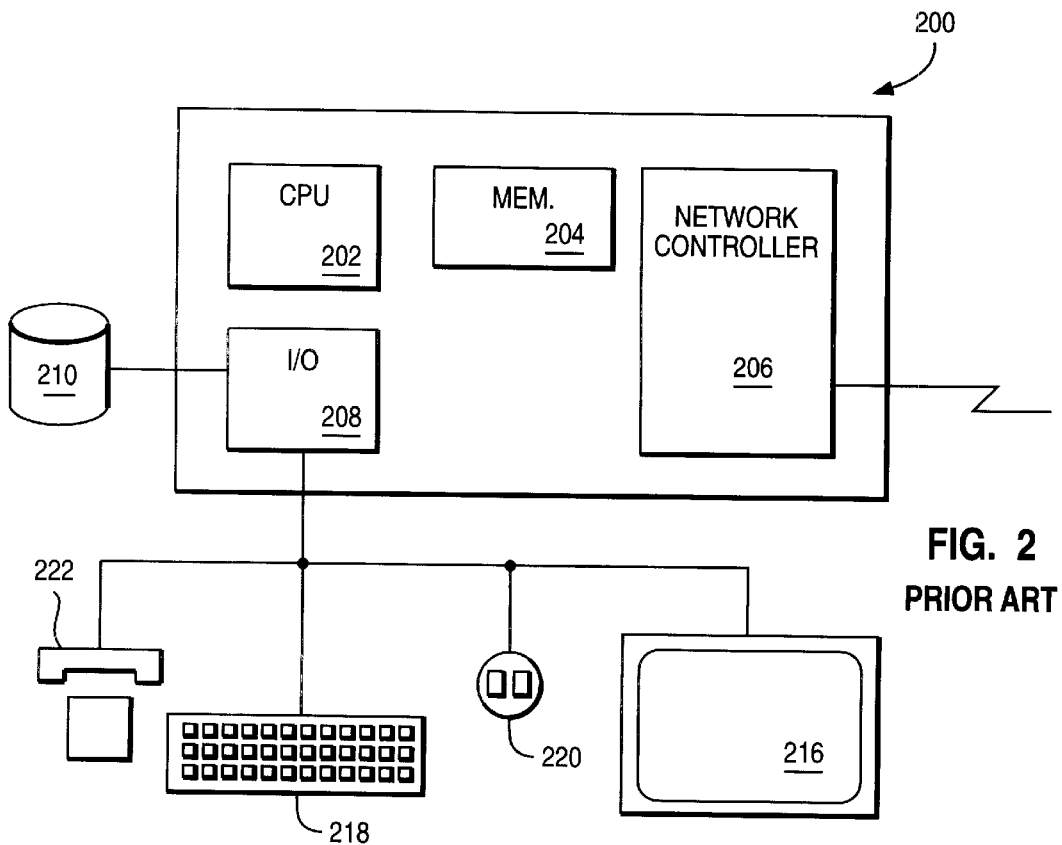
FIG. 2 is a block diagram illustrating a computer system upon which the current invention operates.

The present invention operates on a computer system as shown generally in FIG. 2. Computer system 200 includes a processor complex 202 and includes one or more central processing units such as the Intel 486, Intel Pentium, or IBM PowerPC processors. Memory 204 is provided for the system and includes random access memory and read only memory. Network controller 206 enables communication with local and remote networks. Input/Output controller 208 supports connection to permanent storage 210 such as magnetic or optical disks and connection to input/output devices. Input/output devices may include display monitor 216, keyboard 218, pointing device 220, and removable storage device 222. The removable storage device 222 can include any known or future device such as flexible diskette, CD ROM or similar technology. The description of the computer system has been provided for illustrative purposes only and the invention is not limited to one particular hardware architecture.

Figure 3:
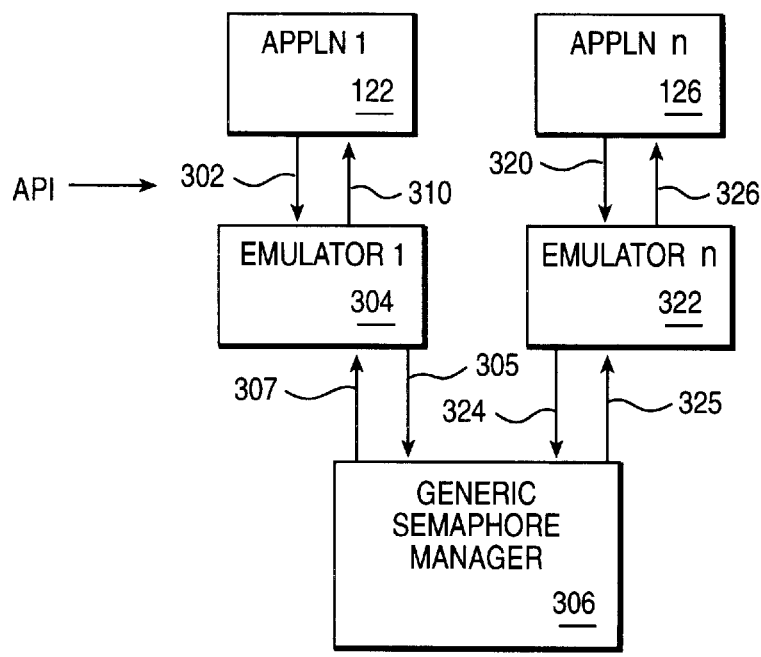
FIG. 3 illustrates the concurrent emulation provided by the generic semaphore operation.

FIG. 3 illustrates the process of converting the semaphore operation written in the syntax of one particular operating system into the generic semaphore syntax. Application program 122 may invoke the semaphore operation using API 302. This is converted by emulator 304 into a generic semaphore operation that manages semaphores 306. A return from the semaphore operation 307 is transformed into the expected return 310 received by the application program 122. Similarly application program 126 may invoke API operation 320 which is converted by the emulator 322 to an API call 324 for managing semaphore 306. The return values 325 are converted to the expected return 326 which is passed back to the application program. Generic semaphore services 306 may comprise multiple semaphores that are managed through the semaphore process.

Figure 4:
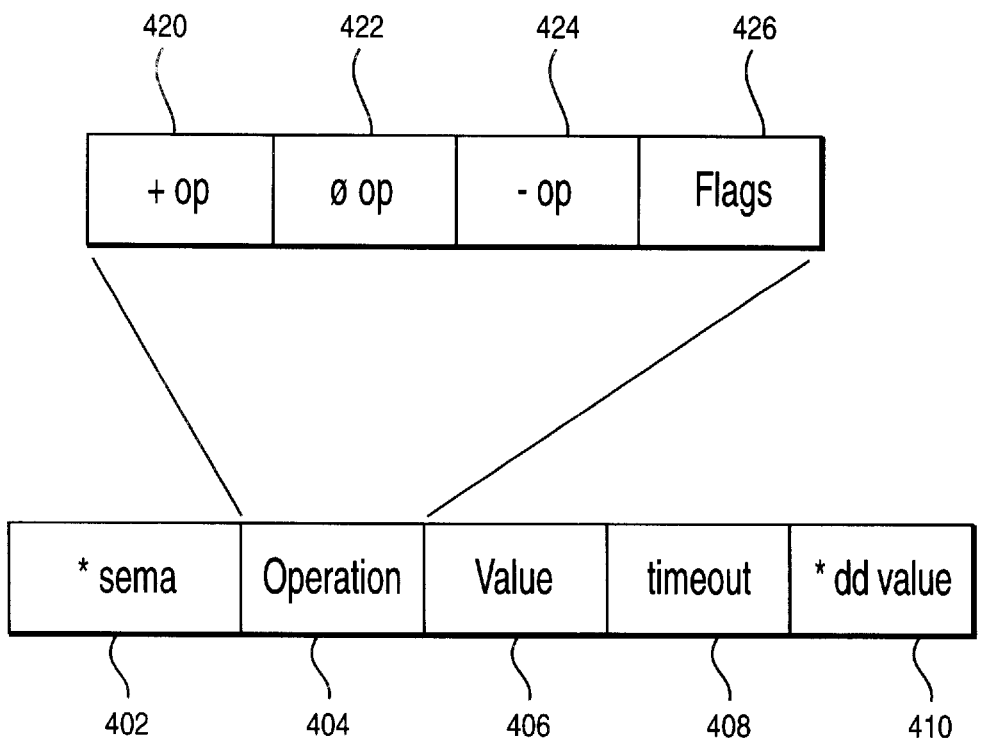
FIG. 4 is an illustration of the generic application programming interface of the preferred embodiment of the present invention.

The semaphore application programming interface according to the present invention is illustrated in FIG. 4. The first field 402 contains the identifier of the semaphore to be modified by this operation. Operation field 404 contains an op code describing the operation to be performed on the semaphore. These operations will be described in greater detail below. The "value" field 406 is used when the semaphore is to be set to a particular value or incremented by a specific value other than one. In the case of both setting and adding, the "value" 406 must be non-negative. Timeout parameter 408 is the timeout to be used in case the thread is placed in the waiting queue. If the timeout expires before the thread receives control an error is returned. The timeout parameter can be encoded to indicate an "infinite timeout", that is, a timeout that never expires causing the thread to wait indefinitely. In the preferred embodiment of the present invention, a timeout bit is set to ignore the timeout causing the thread to block indefinitely. Finally, the "old value" field 410 returns the value of the semaphore before the operation is performed. The calling routine provides a pointer to a memory location to the semaphore function; if the pointer is null the semaphore function does not return an "old value."

Operation field 404 of the preferred embodiment is implemented in a 32 bit field that is divided into 4 bytes. The first byte 420 contains the operation to be performed if the semaphore value is positive. Second byte 422 contains the operation to be performed if the semaphore value is zero and field 424 the operation to perform if the semaphore value is negative. Field 426 contains flags that modify the operations of the previous field. A zero in any of the three most significant bytes (420, 422, 424) indicates to the semaphore function that no operation is to be performed when the value is positive, zero or negative respectively, though the old value will be returned.

The first three byte positions can contain indicators to perform the following operations. The semaphore value V can be operated upon as follows:

decrement (V=V−1)

increment (V=V+1)

set to zero (V=0)

set to one (V=1)

set (V=C), where (C=value 406)

add (V=V+C).

In addition to invoking these operations based upon the value of semaphore V, all the operations can be performed regardless of the value of V. Combinations of conditions may also be implemented, including the ability to modify the value if it is not positive (i.e. is zero or negative) or is not negative (i.e. is zero or positive). Finally, a "flag value" field is provided to set the timeout bit so that a waiting thread will never time out.

Table 1 illustrates the mapping between semaphores of several different operating systems to the emulated generic semaphore of the present invention. This listing is not exhaustive and is only an example of the application of the present invention.

TABLE 1

| SEMAPHORE NAME | OPERATION | EMULATION |
| --- | --- | --- |
| Dijkstra counting semaphore | P | DECR |
|  | V | INCR |
| Sequencer | ticket | INCR |
| OS/2 EventSem | DosPostEventSem | SET_TO_ONE_IF_NEG \| INCR_IF_NOT_NEG |
|  | DosWaitEventSem | DEC_IF_NOT_POS |
|  | DosResetEventSem | SET_TO_ZERO_IF_POS |
| Taligent TMonitorCondition | Wait | Sync_wait (1) |
|  | Notify | INCR_IF_NEG |
|  | Broadcast | SET_TO_ZERO |
| POSIX condition variable | pthread_con_init | Sync_wait (1) |
|  | pthread_con_signal | INCR_IF_NEG |
|  | pthread_con_broadcast | SET_TO_ZERO |
| POSIX counting semaphore | sem_wait | DECR |
|  | sem_post | INCR |
| OS/400 send-receive count | receive | DECR |
|  | send | INCR |
| Kaleida Condition | acquire | DECR |
|  | relinquish | SET_TO_ZERO |
| Kaleida Flag | acquire | DECR_IF_NEG |
|  | relinquish | SET_TO_ZERO |
| Windows NT manual event | SetEvent | SET_TO_ONE |
|  | ResetEvent | SET_TO_ZERO |
|  | PulseEvent | SET_TO_ZERO_IF_NEG |
|  | WaitForSingleObject | DECR_IF_NOT_POS |
| Windows NT auto event | SetEvent | INCR_IF_NEG \| SET_TO_ONE_IF_NOT_NEG |
|  | ResetEvent | SET_TO_ZERO |
|  | PulseEvent | INCR_IF_NEG |
|  | WaitForSingleObject | DECR |
| Windows NT semaphore | ReleaseSemaphore | ADD |
|  | WaitForSingleObject | DECR |
| ethreads condition variable | condition_wait | Sync_wait (1) |
|  | condition_signal | INC_IF_NEG |
|  | conditon_broadcast | SET_TO_ZERO |

(1) Sync_wait is used to emulate operations that apply to a lock and a semaphore.

In operation, the semaphore call of a particular operating system is transformed into the generic semaphore by microkernel services. The semaphore is modified as specified by the generic semaphore operation and the necessary value is returned to the operating system.

Figure 5:
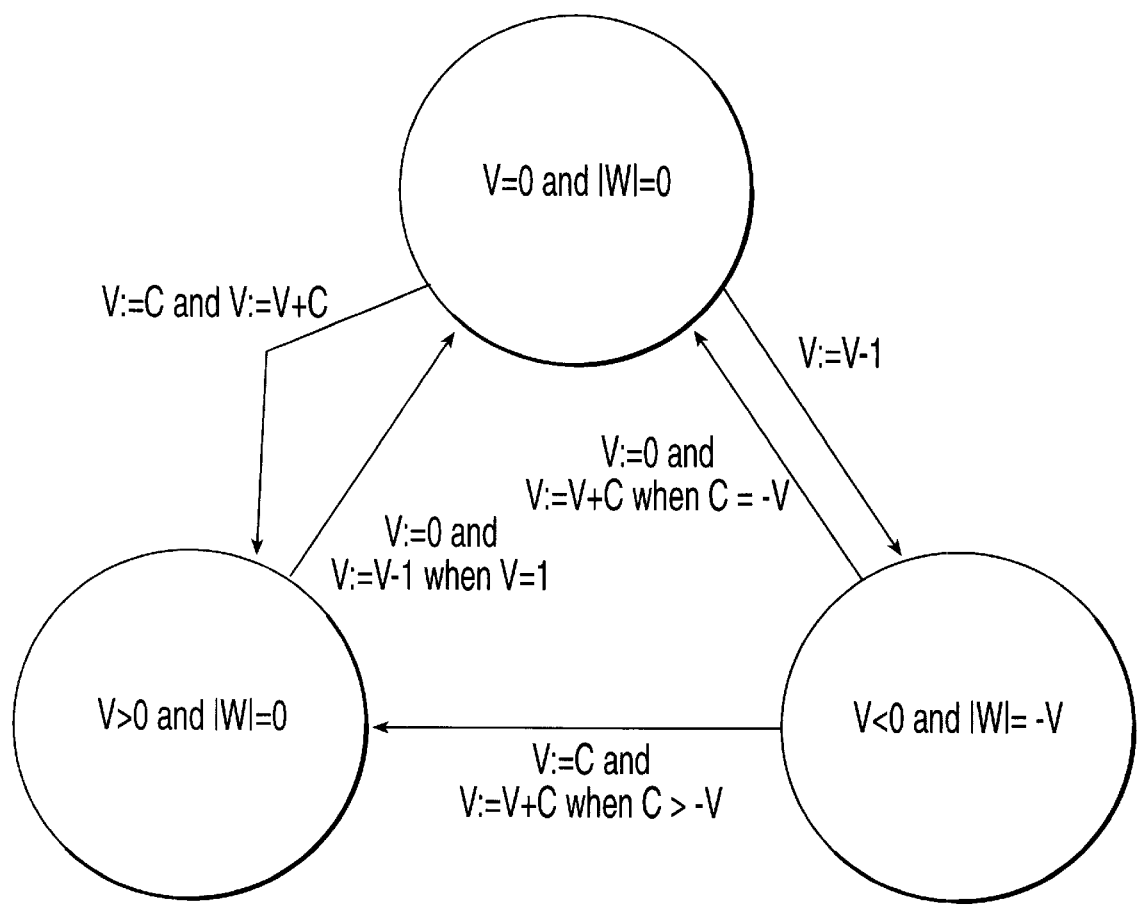
FIG. 5 is a state diagram showing the state transitions for a semaphore according to the present invention.

FIG. 5 illustrates the state transitions of a semaphore according to the present invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A system for synchronizing operations in a computer system having processor means, memory means, and concurrently executing two or more operating system personalities, the system comprising:

means for receiving an operating system specific semaphore operation;

means for testing said operating system specific semaphore operation to determine a transformation;

means for transforming said operating system specific semaphore operation into a generic semaphore operation using said transformation in response to said means for testing;

execution means for executing the generic semaphore operation; and storage means for storing the results of said generic semaphore operations.

2. The system of claim 1, wherein said means for transforming, transforms an operating system semaphore operation into a generic semaphore function application programming interface for execution by said execution means.

3. The system of claim 2, wherein the generic semaphore application programming interface comprises a semaphore identifier, an operation code, and a semaphore value.

4. The system of claim 3, wherein the operation code can be one of: decrement semaphore, increment semaphore, set semaphore to zero, set semaphore to one, set semaphore to a non-negative value, add a non-negative value to semaphore.

5. The system of claim 3, further comprising:

means for adding a thread requesting a semaphore operation to a set of waiting threads if said semaphore value is not positive.

6. A computer implemented method for synchronizing threads in a computer system executing two or more operating system personalities, said operating system personalities having at least two different synchronization syntaxes, the method comprising the steps of:

intercepting each synchronization request from one of said two or more operating system personalities;

transforming said intercepted request into a generic synchronization format by applying a transformation in response to the synchronization syntax of said operating system personality; and performing said synchronization operation.

7. The method of claim 6, wherein the generic synchronization format includes a semaphore identifier and a semaphore operation, and wherein the step of performing the synchronization operation includes the steps of:

testing a stored semaphore value indicated by said semaphore identifier to determine a semaphore state;

changing said stored semaphore value based upon said semaphore state and said synchronization operation.

8. The method of claim 7, wherein said intercepted request originates in a requesting thread and wherein the method includes the step of:

adding an indicator for said thread to a set of waiting threads if said semaphore state blocks further execution of said thread.

9. A computer program product having a computer readable medium having computer program logic recorded thereon for synchronizing thread operations between two or more operating system personalities having at least two different synchronization formats, said computer program product comprising:

computer program product means having computer readable means for intercepting a synchronization request from one of said two or more operating system personalities;

computer program product means having computer readable means for transforming said request into a generic semaphore operation in response to the synchronization format of the associated operating system format; and computer program product means having computer readable means for executing said generic semaphore operation.

10. The computer program product of claim 9, further comprising:

computer program product means having computer readable means for testing said semaphore operation to determine a semaphore state; and computer program product means having computer readable means for modifying a semaphore value based on said state and said semaphore operation.

11. The program product of claim 10, further comprising:

computer program product means having computer readable means for adding an indicator of a thread operation requesting synchronization to a set of waiting threads in response to said semaphore state.

* * * * *